Sept. 20, 1932.  S. B. GRISCOM  1,878,774
TRANSMISSION LINE PROTECTIVE SYSTEM
Filed March 24, 1931   2 Sheets-Sheet 2
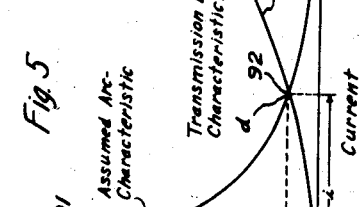
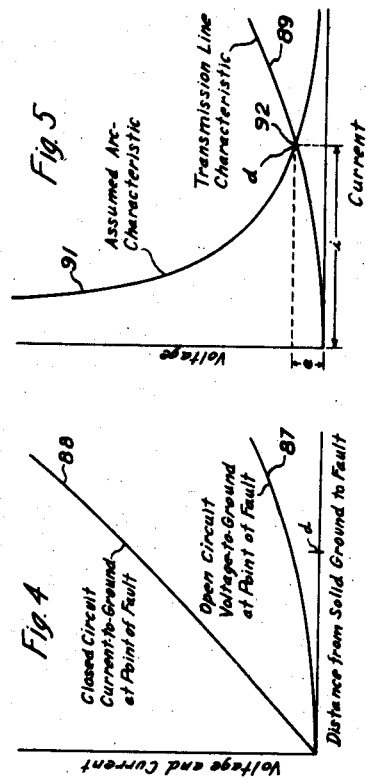
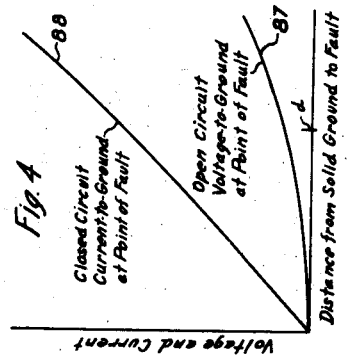
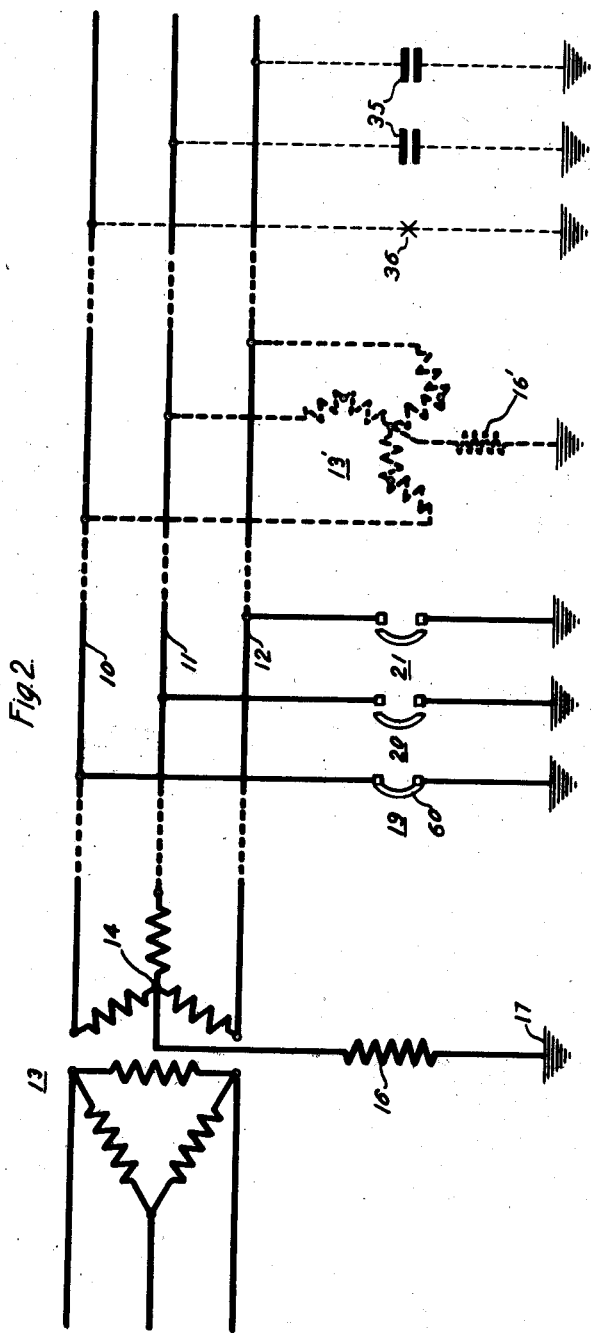
INVENTOR
Samuel B. Griscom.

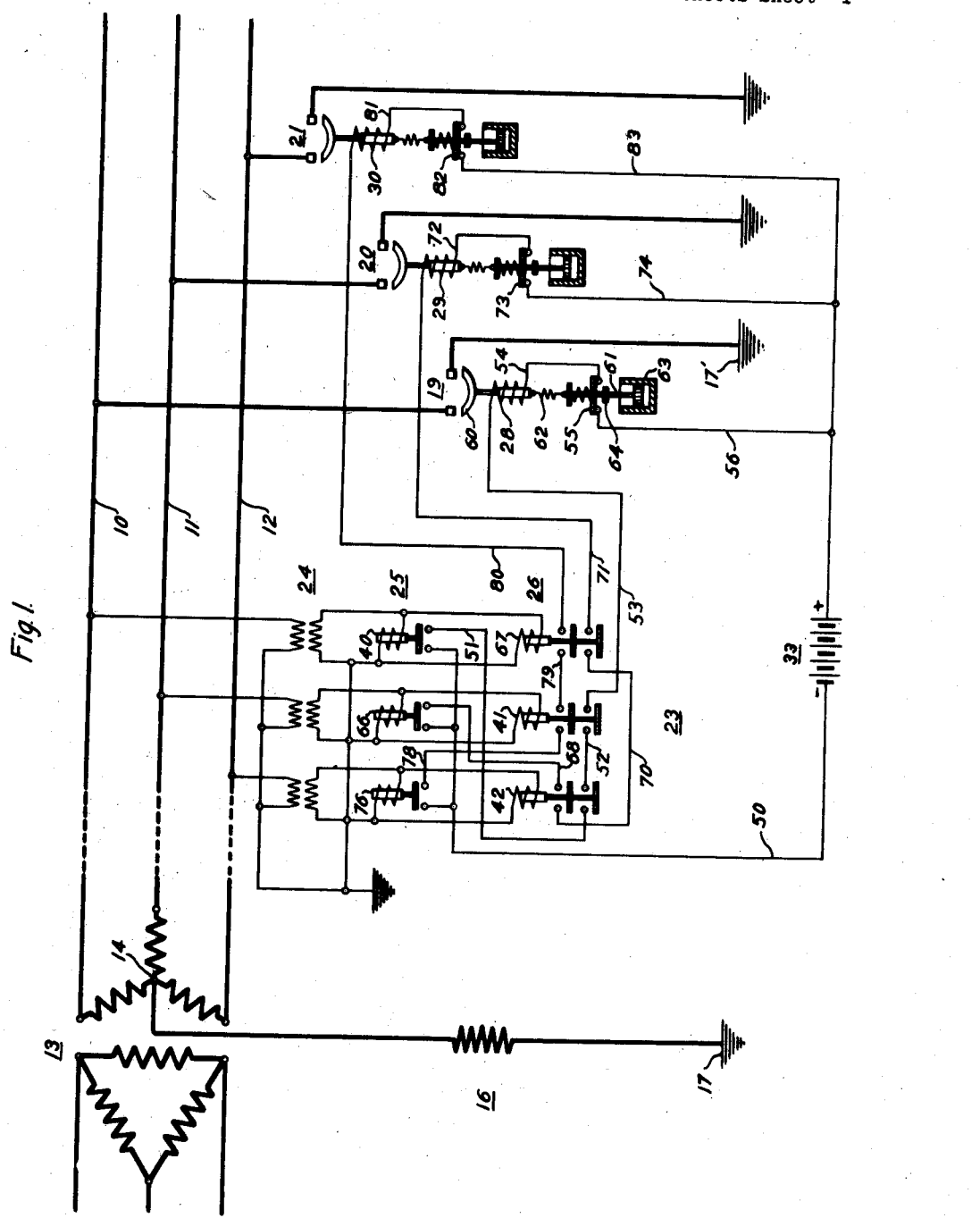

UNITED STATES PATENT OFFICE

SAMUEL B. GRISCOM, OF SWISSVALE, PENNSYLVANIA, ASSIGNOR TO WESTINGHOUSE ELECTRIC & MANUFACTURING COMPANY, A CORPORATION OF PENNSYLVANIA

TRANSMISSION-LINE PROTECTIVE SYSTEM

Application filed March 24, 1931. Serial No. 524,809.

My invention relates to systems for protecting electrical circuits and has particular relation to systems for extinguishing ground-fault arcs on alternating-current transmission lines.

Alternating-current transmission lines, especially when operated at the high potentials now commercially employed, are, as is well known in the art, frequently subject to earth faults or accidental grounding. Insulator flash-overs, caused by abnormal voltage surges, accidental physical contacts of the line conductors with grounded objects, and other comparable conditions establish ground faults on the system which tend to produce and maintain arcs at the points of break down. Such arcs are found, in the absence of special suppressing means, to persist indefinitely unless the faulted conductor burns away or the power is interrupted.

In order that an arc to ground may be extinguished, it is necessary that the voltage between the faulted conductor and ground be reduced to an exceedingly low value, or that the fault current be diverted from the arc by way of some other path.

In the past, suppression of the arc has been attempted in several different ways. One method which has been proposed contemplates the provision of means for solidly grounding the faulted conductor upon the occurrence of a fault. Another method contemplates the use of a neutral grounding reactance so dimensioned as to substantially neutralize the earth capacitance current of the ungrounded portion of the system to thereby diminish the fault current at the point of breakdown.

While, in certain applications, each of these methods is capable of effecting arc suppression, in some cases considerable difficulty has been experienced in the attainment of the desired results. Thus, in the case of the faulted-conductor grounding scheme, it is shown, hereinafter, that where the fault occurs at a considerable distance from the grounding device, on the transmission line, the voltage-to-ground at the point of fault is not reduced to zero by connecting the conductor to ground at the other distantly located point, and, for this reason, the arc cannot always be suppressed.

Likewise, the tuned-neutral-grounding-reactance method is subject to the disadvantage of an appreciable percentage of suppression failures, since, in practice, it has been found highly difficult to so proportion the value of reactance that fault-current neutralization shall be completely attained for all earth faults.

In addition, it is impossible, by this scheme alone, to completely compensate for harmonic currents, nor can components of current which are in phase with the main voltage acting in the transmission circuit, such, for example, as active residual ground currents, be neutralized by this method.

Thus, while both of these schemes have been known for several years, neither has come into general use because of their relatively low arc-suppressing efficiencies, as well as other inherent limitations. My invention is directed to a method of arc suppression which overcomes, in an effective manner, the disadvantages just pointed out.

Generally stated, it is the object of my invention to provide a protective system for alternating-current transmission lines which functions to positively suppress ground-fault arcs.

One specific object of my invention is to provide, in an electrical system of the type described, means for reducing to zero the potential-to-ground of an earth-faulted conductor at substantially all points in the system.

Another object of my invention is to provide a protective system whereby, when an earth-fault arc occurs on the transmission line, the arc will immediately be deprived of all current which tends to maintain it.

A further object of my invention is to provide, in a protective arrangement of the type described, means whereby, when the arc has been extinguished, the system protected will be restored to its normal operating condition within a predetermined time.

More specifically stated, it is the object of my invention to provide protective means for alternating-current transmission and distribution systems which function to positively suppress all earth-fault arcs occurring upon the system conductors, regardless of the remoteness of the fault location from the protective equipment.

In practicing my invention, I attain these and other objects through the use of a suitably proportioned neutral grounding device, in combination with means for solidly grounding the faulted conductor upon the occurrence of a fault. By such a protective combintaion, I am able to attain arc-suppressing results far superior to those possible with any of the systems heretofore known and utilized.

My invention itself, together with additional objects and advantages thereof, will best be understood from the following description of a specific embodiment, when read in connection with the accompanying drawings in which:

Figure 1 is a diagrammatic representation of a protective system, arranged in accordance with my invention, applied to a polyphase alternating-current transmission circuit.

Fig. 2 is a simplified diagram of the system of Fig. 1, which is extended to include a considerable length of the transmission line protected.

Fig. 3 is a diagram of a typical transmission line protected by a faulted-conductor grounding scheme alone.

Figs. 4 and 5 are diagrams of curves illustrating characteristics which are inherent in the transmission line of Fig. 3.

Referring to the drawings, particularly Fig. 1 thereof, the line conductors of a polyphase transmission system are shown at 10, 11 and 12. A star-delta connected transformer bank, which may be disposed to supply power voltage to the line conductors from some suitable generating source (not shown), is represented at 13. In the transformer bank illustrated, it will be recognized that an electrical neutral point for the system is established at 14. It will be understood, however, that, so far as my invention is concerned, any other equivalent means for establishing the electrical neutral, such as the well known "zig-zag" transformer or equivalent device, may instead be utilized.

To provide means for reducing, to a relatively low value, the current which flows through a point of accidental ground contact with any of the line conductors, I provide one or more reactive neutral-grounding circuits, such as is shown at 16, or the equivalent thereof. Preferably, the reactive circuit is so proportioned as to substantially neutralize, in the case of a ground fault, the capacitance current-to-ground of the ungrounded portion of the system.

It will be understood that such complete neutralizing conditions obtains when the reactive current which flows from the system neutral 14 to the ground 17, through the reactive circuit 16, upon the occurrence of a ground fault, in addition to being of opposite phase relation to that of the system capacitive current which tends to flow to ground through the point of breakdown, is also of similar magnitude to that of the capacitive current. As will presently be evident, however, in the protective system of my invention, complete fault-current neutralization by this means is not required to effect suppression of the earth-fault arc. Hence, the electrical dimensions of the neutral grounding circuit 16 need not be accurately adjusted to the exact or critical degree which previously known systems of this general type have required for their operation.

In addition to the neutralizing expedient, which, by itself, has in many cases, proved inadequate to give the arc-suppressing results desired I provide supplementing means in the form of normally-open conductor-grounding switches 19, 20 and 21, which are disposed to close, upon the occurrence of a ground fault to solidly connect the faulted system conductor to the ground. That such a combination is capable of an extremely high suppressing efficiency will become apparent from a further consideration of the general problem to be solved.

To more clearly illustrate the limitations of arc-suppressing systems of the faulted-conductor-grounding type known heretofore and to show the manner in which they are overcome in the system of my invention, the curves of Figs. 4 and 5 have been drawn for a transmission line thus protected. The simplified diagram of Fig. 3 illustrates such a line. It will be understood that no neutral-grounding reactance devices are utilized in the line of Fig. 3.

For such condition, the solid grounding of a conductor does not reduce its potential-to-ground to zero magnitude at points remotely located from the point where the solid ground is applied. Thus, in Fig. 3 a solid ground, represented at 85, applied to line conductor 86 of the polyphase transmission system represented while reducing the potential between conductor 86 and the ground to zero at the given point, is ineffective at distantly located points. The curve 87 of Fig. 4, which, together with curve 88 of the same figure and curve 89 of Fig. 5, has been derived from the known characteristics of a typical transmission line of commercial voltage, frequency, and general design clearly illustrates this relation.

It will be seen that the conductor voltage-to-ground at any point on the conductor, when an actual fault is not present, rises as the point of solid grounding is departed from. The well known attenuation effect, peculiar to transmission circuits, accounts for the upwardly curved shape of curve 87 of Fig. 4.

Similarly, if a solid type of fault is produced on a given conductor, this conductor being solidly grounded at another point, the current that flows through the fault likewise increases as the distance from the point of grounding is increased. This relation for the typical transmission line mentioned, is given by curve 88 of Fig. 4. Consequently, with an arcing type of fault, such as is illustrated at 90 in Fig. 3, the voltage and current available to sustain the arc both increase as the point of grounding is departed from, so that, at a sufficient distance from the application of the solid ground, the arc will sustain itself and cannot be quenched by this means alone.

In Fig. 5 I have illustrated by curve 91, the current-voltage characteristic which is assumed to apply to the arc which may be set-up at the ground fault 90 of Fig. 3. It will be recognized that the shape of curve 91 is typical of arcs, in general, and, as shown is felt to be representative and consistent. To the same scale as curve 91, I have drawn curve 89 which is a combination of curves 87 and 88 of Fig. 4. Curve 89 may be termed the transmission-line characteristic, since it shows, at any given point on the conductor, where a fault might occur, which conductor is solidly grounded at another point, as at 85 in Fig. 3, the voltage-to-ground when a fault is not present, and also the current which will flow from that point to ground when a fault of the solid type is there present.

Thus, at point 92, which corresponds to some given distance from the point of solid groundings, which distance is designated by $d$ in Figs. 3, 4 and 5, there is a maximum available voltage-to-ground of the value $e$, and there can flow through a solid connection-to-ground at this point a maximum current indicated by $i$.

It will be apparent, from examination of curves 91 and 89 of Fig. 5, that, for the given transmission system considered, a solid grounding of the faulted conductor can be effective for arc suppression only when the location of the arc is within the distance range, from the point of solid grounding, indicated by $d$, as, within this range, the conductor voltage-to-ground at the point of arcing is reduced to a value below that required to sustain the arc. It will thus be seen that point 92, which is the point of intersection between curves 91 and 89, determines the distance limit within which solid grounding alone is effective.

Likewise, it will be apparent that, for distances in excess of that represented by $d$, there is available between the conductor and ground a voltage in excess of that required to sustain the arc, and, likewise, a current sufficient to maintain the conducting path through the arc in an active state.

For such condition, it will be evident that the arc will persist. Such being the case, it is apparent that the mere grounding of a faulted conductor at points beyond a given distance from the fault is ineffective, in the absence of other neutralizing means, for suppressing the arc which may there be started, since the voltage-to-ground at the point of breakdown cannot thereby be reduced to the low value required for suppression.

By providing the transmission system with suitable neutral-grounding devices, of the type already described, the line characteristic curve 89 may be greatly modified, to the extent, in fact, that it may be made to closely approach the horizontal current axis of Fig. 5. In other words, the effect of neutral-grounding reactances, when suitably combined with the transmission system of Fig. 3, for instance, is to greatly reduce the open circuit voltage-to-ground at all points on the conductor, so that curve 87 of Fig. 4 is flattened. In a similar manner, the current-distance curve 88 of the same figure is simultaneously made less steep.

Thus, through the provision of the neutral grounding reactance devices, the action of the grounding breakers is made exceedingly more effective, such grounding reactances having the effect of lessening the effective distance between the fault and the point of grounding and thereby reducing the voltage across the arc of the fault and the current through it. Supplemented by the solid grounding action of the breaker, the voltage across the point of breakdown is further reduced to practically zero, regardless of the distance of the fault from the protective apparatus in question, so that, regardless of the distance of the fault from the point of solid grounding, there will be insufficient voltage and current available to sustain any arc which may there form.

To control the operation of grounding switches or breakers 19, 20 and 21, in response to the occurrence of ground faults, I utilize any suitable relay scheme, such as the conductor-to-ground voltage-responsive system shown generally at 23. This system comprises the star-connected potential transformers illustrated at 24, the primary windings of which are joined to the system line conductors 10, 11 and 12, in the manner shown. The secondary windings of the transformers are disposed to energize the actuating coils of a gorup of undervoltage responsive relays, shown generally at 25, and the coils of a similar group of overvoltage responsive relays, shown generally at 26. As illustrated, relays 25 and 26 are all in the normal or unactuated positions corresponding to normal balanced-voltage conditions among the system conductors 10, 11 and 12.

Each of the grounding switches 19, 20 and 21 is provided with a suitable actuating winding, illustrated at 28, 29 and 30, respectively, which, when energized, moves the main contact member upwardly, from the normally open position illustrated, to the closed position. The closed position is maintained only so long as the winding energization continues, the switch returning to the open position, upon deenergization, under the action of gravity or other suitable restoring force.

Any suitable source of power, such as a battery 33, may be utilized to actuate the grounding breakers in response to the operation of the relays in groups 25 and 26. An examination of the control circuits shown will reveal that the actuation of an undervoltage relay, in group 25, associated with one of the transmission conductors 10, 11 and 12, and the simultaneous actuation of the two overvoltage relays, in group 26, associated with the other two transmission-line conductors, will complete an energizing circuit for the grounding breaker associated with the first mentioned line conductor, thereby effecting the breaker closure.

Referring to Fig. 2, the system of Fig. 1 is there represented, in simplified form, to more clearly illustrate its functioning, as regards arc suppression. In addition to the neutral grounding reactance 16 and the conductor-grounding breakers 19, 20 and 21, I have shown a second neutral grounding device in the form a "zig-zag" transformer 13' and a reactive circuit 16' to ground, as representative of the plurality of such devices which may be utilized at different points in a transmission system. As will become apparent, the maximum benefit from the reactive grounding devices is secured when they are distributed at various points throughout the system.

The broken-line sections of the line conductors 10, 11 and 12, represent considerable lengths of transmission line which may separate the several parts of the protective system.

The conductor capacitance-to-ground is represented, in Fig. 2, by the condenser symbols 35. For purposes of explaining the operation of my invention, a ground fault is assumed to have occurred on conductor 10, and is there represented at 36, the condenser symbol thus being omitted for this conductor.

Thus, in the system of Fig. 2, as there represented at 36, the occurrence of a fault on transmission conductor 10, causes grounding breaker 19 to close, through the action of the relay system 23 illustrated in Fig. 1, in the manner to be explained, and the voltage-to-ground of conductor 10 at the point of fault is thereby reduced to substantially zero so that any arc which may have formed is effectively quenched. The functioning of the relay system 23 of Fig. 1 is as follows:

A ground fault on conductor 10, for instance, as is shown in Fig. 2, lowers the potential-to-ground of this conductor below the normal value, and, at the same time, raises, as is well known for "shiftable neutral" systems, the potential-to-ground of conductors 11 and 12 to above normal value. Potential transformers 24 transmit the unbalanced voltage condition to the relays, allowing undervoltage relay 40 to move downwardly to its closed-contact position and causing overvoltage relays 41 and 42 to be actuated upwardly to their closed-contact positions.

An energizing circuit for grounding breaker 19 is thereby completed to extend from one side of battery 33, through conductor 50, closed contact of undervoltage relay 40, conductor 51, closed contact of overvoltage relay 42, conductor 52, closed contact of overvoltage relay 41, conductor 53, actuating coil 28 of grounding breaker 19, conductor 54, closed contact 55 of a time-delay breaker-reopening device and conductor 56, to other side of battery 33.

Thus energized, the actuating coil moves the main contact 60 of grounding breaker 19 upwardly to the closed position, thereby connecting line conductor 10 solidly to the ground 17' to effect arc suppression at the point of breakdown, on line conductor 10, in the manner already explained.

In order that the transmission system may be restored to the normal operating condition, this arc suppression having been effected, I provide means for causing the grounding breaker to automatically reopen after a predetermined time delay, which means may be in the form of the delay device, the contact 55 of which has been mentioned in connection with grounding breaker 19. As illustrated, the device may comprise a movable plunger assembly 61 connected to the main breaker movable element through the medium of a spring 62.

The upward or closing movement of the main breaker element 60 places spring 62 under tension, which causes plunger 61 to start moving upwardly at a slow rate, under the control of a dash pot 63 or other suitable movement-retarding device. After a predetermined time, plunger collar 64 engages contact segment 55, through which rod 61 is free to slide, and segment 55 is thus moved upwardly out of engagement with the stationary contact elements with which it cooperates. This action breaks the energizing circuit of breaker-closing coil 28 and allows the breaker to return to the normally open position.

It will be understood that any other equivalent device for causing the grounding breaker to reopen after a time sufficient for the earth-fault arc to be extinguished, may be utilized in the system of my invention.

It should be noted that, due to the action of the system neutral grounding circuit 16, the current flow through the closed grounding breaker is reduced to a relatively low value, and thus only a small interrupting duty is imposed on the breaker in its reopening operation.

Reference to Fig. 1 will show that the occurrence of a fault on line conductor 11 causes undervoltage relay 66 to close, and overvoltage relays 42 and 67 to simultaneously operate, thereby energizing the closing coil of grounding breaker 20 through a circuit which extends from battery 33, conductor 50, closed contact of relay 66, conductor 68, closed contact of relay 42, conductor 70, closed contact of relay 67, conductor 71, actuating coil 29 of breaker 20, conductor 72, closed contact 73, of breaker reopening device and conductor 74, to the other side of the battery. Breaker 20 is thus actuated to its closed position, and the arc which may have started at the point of breakdown is effectively suppressed. Breaker 20 is then allowed to reopen through the circuit-interrupting action of time-delay contact 73, in the manner already explained.

Similarly, a ground fault upon line conductor 12 will cause undervoltage relay 76 and overvoltage relays 41 and 67 to simultaneously close, to complete an energizing circuit for the closing coil of grounding breaker 21, which extends from battery 33, through conductor 50, closed contact of relay 76, conductor 78, closed contact of relay 41, conductor 79, closed contact of relay 67, conductor 80, actuating coil 30 of breaker 21, conductor 81, contact 82, of reopening device, and conductor 83, back to the battery. Closure of breaker 21 acts, in the manner explained, to suppress the earth-fault arc and is reopened after a predetermined time by the action of contact 82, in the manner explained.

It will be understood that, although I have shown a control system for the conductor-grounding breakers which is responsive to unbalanced line-conductor voltage-to-ground, produced by the occurrence of an accidental ground fault, any other control scheme that shall be responsive to the occurrence of a ground fault may be utilized with equal success in the system of my invention. Furthermore, while I have here shown a star-delta connected system of electrical transmission or distribution, as the case may be, which has grounding reactances connected to the system neutral, it will be apparent to those skilled in the art that the application of my invention is not limited to star-connected systems, but, as has been mentioned, may be applied to any system in which a neutral point may be established for connecting to the ground through an inductive circuit of appropriate electrical dimensions.

Although I have shown and described a certain specific embodiment of my invention, I am fully aware that many further modifications thereof, in addition to those mentioned, are possible. My invention, therefore, is not to be restricted, except insofar as is necessitated by the prior art and by the spirit of the appended claims.

I claim as my invention:

1. A system for extinguishing arcs on alternating-current transmission lines, comprising, in combination with the several line conductors, means for establishing an electrical neutral among the conductors, an inductive circuit for connecting said neutral to the ground, an electrical connection from each line conductor to ground, a normally open switch disposed in each of said connections, and means for closing each of said switches in response to an occurrence of a ground fault on the conductor respectively associated therewith, said inductive circuit being so dimensioned electrically as to substantially neutralize, when a ground fault occurs, the capacity current to ground of the ungrounded system conductors.

2. A system for extinguishing arcs on alternating-current transmission lines comprising, in combination with the several line conductors, each of which normally differs from ground potential, means for establishing an electrical neutral among the conductors, an inductive circuit for connecting said neutral to ground, an electrical connection from each line conductor to ground, a normally open switch disposed in each of said connections for the control thereof, electro-responsive switch-closing means and actuating circuits therefor, and switch-control means selectively responsive to the occurrence of a ground fault on any of the said line conductors, said control means comprising undervoltage and overvoltage-responsive relays associated with the respective line conductors and disposed to energize the actuating circuit of each of said switch-closing means when the voltage to ground of the associated line conductor drops below the normal unfaulted value and the voltage to ground of the remaining conductors simultaneously rises above the normal value.

3. A system for extinguishing arcs on alternating-current transmission lines comprising, in combination with the several line conductors, means for establishing an electrical neutral among the conductors, an inductive circuit for connecting said neutral to ground, an electrical connection from each line conductor to ground, a normally open switch disposed in each of said connections for the control thereof, means for closing each of said switches in response to an occurrence of a ground fault on the conductor respectively associated therewith, and means for causing said switches to reopen after a predetermined time from the instant of closure, said inductive circuit being so dimensioned electrically as to substantially neutralize, when a ground fault occurs, the capacity current to ground of the ungrounded system conductors.

4. In combination with an alternating-current transmission and distribution system having an electrical neutral, a reactive circuit, approximately tuned with the system-to-earth capacitance for connecting said neutral to ground, an electrical connection from each system conductor to ground, a normally open switch disposed in each of said connections, means for closing each of said switches in response to the occurrence of a ground fault on the corresponding system conductor, and means for causing said switches to reopen after a predetermined time.

5. A system for extinguishing arcs on alternating-current transmission lines comprising, in combination with the line conductors, each of which normally differs from ground potential, means for establishing an electrical neutral point therein, an inductive circuit for connecting said neutral to the ground, an electrical connection from each line conductor to ground, a switch for closing each of said connections, means for operating each switch, conductor voltage-to-ground responsive relay means disposed to energize the operating means of each switch when the voltage-to-ground of the associated line conductor falls a predetermined amount below normal and the voltages to ground of the remaining line conductors simultaneously rise a predetermined amount above normal, and means for causing said switches to reopen after a predetermined time.

6. A protective scheme for alternating-current electrical systems comprising, in combination with the line conductors, conductor-to-earth capacitance current-reducing means in the form of system neutral grounding reactances, faulted-conductor grounding means in the form of normally-open grounding switches disposed for selective closure upon the occurrence of a ground fault upon any of said system conductors to thereby suppress any arc which may have formed at the point of breakdown, and means for causing said switches to reopen after a predetermined time.

7. In combination with an alternating-current transmission and distribution system having an electrical neutral, an inductive circuit for connecting said neutral to ground, an electrical connection from each system conductor to ground, a normally open switch disposed in each of said connections, and means for closing each of said switches in response to the occurrence of a ground fault on the corresponding system conductor, said inductive circuit being so dimensioned electrically as to cause the extinguishment of any arc which may be set up at the point of said ground fault.

8. A system for extinguishing arcs on alternating-current transmission and distribution lines comprising, in combination with the several conductors of the line, means for establishing an electrical neutral among the conductors, an inductive circuit for connecting said neutral to the ground, an electrical connection from each line conductor to ground, a normally open switch disposed in each of said connections, and means for closing each of said switches in response to the occurrence of a ground fault on the conductor respectively associated therewith, said inductive circuit being so dimensioned electrically as to suppress the current which flows through the point of said ground fault to the extent that any arc which may there be set up will be extinguished.

In testimony whereof, I have hereunto subscribed my name this 17th day of March, 1931.

SAMUEL B. GRISCOM.